(12) United States Patent
Earnshaw et al.

(10) Patent No.: US 8,670,530 B2
(45) Date of Patent: Mar. 11, 2014

(54) METHODS AND DEVICES TO RETRIEVE VOICE MESSAGES

(75) Inventors: Andrew Mark Earnshaw, Kanata (CA); Jianfeng Weng, Kanata (CA)

(73) Assignee: BlackBerry Limited, Waterloo (CA)

( * ) Notice: Subject to any disclaimer, the term of this patent is extended or adjusted under 35 U.S.C. 154(b) by 69 days.

(21) Appl. No.: 13/323,025

(22) Filed: Dec. 12, 2011

(65) Prior Publication Data

US 2013/0148791 A1 Jun. 13, 2013

(51) Int. Cl.
*H04M 1/64* (2006.01)

(52) U.S. Cl.
USPC .................................. 379/88.25; 455/413

(58) Field of Classification Search
USPC .............. 379/88.22–88.25; 455/413
See application file for complete search history.

(56) References Cited

U.S. PATENT DOCUMENTS

| | | | | |
|---|---|---|---|---|
| 4,625,081 A | * | 11/1986 | Lotito et al. ................ | 379/88.26 |
| 4,935,954 A | * | 6/1990 | Thompson et al. ......... | 379/88.04 |
| 5,822,405 A | * | 10/1998 | Astarabadi ................. | 379/88.04 |
| 5,995,824 A | * | 11/1999 | Whitfield .................... | 455/412.1 |
| 6,049,765 A | | 4/2000 | Iyengar et al. | |
| 6,366,651 B1 | * | 4/2002 | Griffith et al. ............. | 379/88.14 |
| 6,651,042 B1 | | 11/2003 | Field et al. | |
| 6,681,124 B2 | * | 1/2004 | Prior et al. .................... | 455/563 |
| 6,760,696 B1 | * | 7/2004 | Goldberg et al. ............. | 704/201 |
| 7,251,604 B1 | | 7/2007 | Thenthiruperai | |
| 2003/0210768 A1 | | 11/2003 | Sahasrabudhe | |
| 2004/0131070 A1 | | 7/2004 | Rogalski | |
| 2005/0186945 A1 | | 8/2005 | Mazor | |
| 2006/0116111 A1 | | 6/2006 | Klicpera | |
| 2006/0287000 A1 | | 12/2006 | Sun | |
| 2010/0091957 A1 | | 4/2010 | Ying et al. | |

FOREIGN PATENT DOCUMENTS

| | | |
|---|---|---|
| EP | 1599022 | 11/2005 |
| WO | WO00/02367 | 1/2000 |

OTHER PUBLICATIONS

European Patent Office, "Extended European Search Report", issued in connection with European patent application No. 11193111.9, Jun. 4, 2012, (6 pages).

\* cited by examiner

*Primary Examiner* — Simon Sing (74) *Attorney, Agent, or Firm* — Steven M. Greenberg, Esq.; CRGO LAW (57) ABSTRACT

Methods and devices to retrieve voice messages are disclosed. An example device includes a network interface to access a voicemail server via a network, a message parser to remove a non-message portion of a voicemail access session from a voicemail access session, and a storage device to store the message portion of the voicemail access session.

16 Claims, 6 Drawing Sheets

METHODS AND DEVICES TO RETRIEVE VOICE MESSAGES

FIELD OF THE DISCLOSURE

This disclosure relates generally to mobile devices and, more particularly, to methods and devices to retrieve voice messages.

BACKGROUND

Mobile communication providers often provide voicemail services. As a part of these voicemail services, a server receives and stores voicemail messages. A user may access his or her voice mailbox via a network connection through the mobile device, and the voicemail server plays the voicemail message via the connection at the request of the user. After listening to a voice message, the user may choose to delete the message from the voicemail server or command the voicemail server to retain a copy of the message for later listening.

DETAILED DESCRIPTION

Methods and devices to retrieve voice messages are disclosed herein. Disclosed example devices include a network interface to access a voicemail server via a network, a message parser to remove a non-message portion from a voicemail access session, and a storage device to store the message portion of the voicemail access session.

Some such example devices further include a user input device, where the message parser is to detect the non-message portion of the voicemail access session based on the user input device. In some examples, the message portion of the voicemail access session comprises a voice message, and the message parser is to detect the voice message based on a comparison of a time length of a speech interval to a threshold. In some example devices, the non-message portion of the voicemail access session includes a voicemail prompt transmitted by the voicemail server, and the message parser is to detect the voicemail prompt based on a comparison of a time length of a speech interval to a threshold.

In some examples, the time length of the speech interval is based on a presence of audio. In some example devices, the non-message portion of the voicemail access session has a substantial lack of audio, and the message parser is to detect the non-message portion based on the substantial lack of audio. Some example devices further include a transcoder to transcode the message portion of the voicemail access session and to store the transcoded message portion. In some examples, the storage device is to store the transcoded message portion in response to a user selecting whether to store the voice message.

In some examples, the message parser is to identify at least one of the message portion or the non-message portion based on non-voice data associated with the voicemail access session and received from the voicemail server. In some examples, the message parser is to determine a state of the voicemail access session based on at least one of a configuration of the voicemail server, non-voice data received from the voicemail server, a voice prompt received from the voicemail server, or a user input, and detect the non-message portion based on a determined state of the voicemail access session.

Some disclosed example devices include a processor and a first storage device, where the first storage device stores machine readable instructions which, when executed by the processor, cause the processor to access a voicemail server via a network, discard a non-message portion of a voicemail access session with the voicemail server, and store a message portion of the voicemail access session on the first storage device or a second storage device.

In some examples, the instructions cause the processor to, in response to a user input, do at least one of store the message portion or identify the non-message portion of the voicemail access session. In some example devices, the instructions cause the processor to discard a substantially silent portion of the voicemail access session. In some examples, the instructions cause the processor to transcode the message portion and store the message portion on the storage device as a transcoded message portion.

In some example devices, the instructions cause the processor to determine a time length of a speech message, to compare the time length to a threshold, and to transcode the speech message when the time length is greater than the threshold. In some examples, discarding the non-message portion includes not storing the non-message portion. In some example devices, the instructions cause the processor to identify the message portion of the voicemail access session based on at least one of a voicemail prompt or a user input.

Some example methods disclosed herein include accessing a voicemail server via a network, automatically discarding a non-message portion of a voicemail access session with the voicemail server, and storing a message portion of the voicemail access session on a storage device. Some example methods further include detecting a user input with the voicemail access session and identifying the non-message portion of the voicemail access session based on the user input. Some example methods disclosed herein further include transcoding the message portion of the voicemail access session, where storing the message portion on the storage device comprises storing the transcoded message portion.

Figure 1:
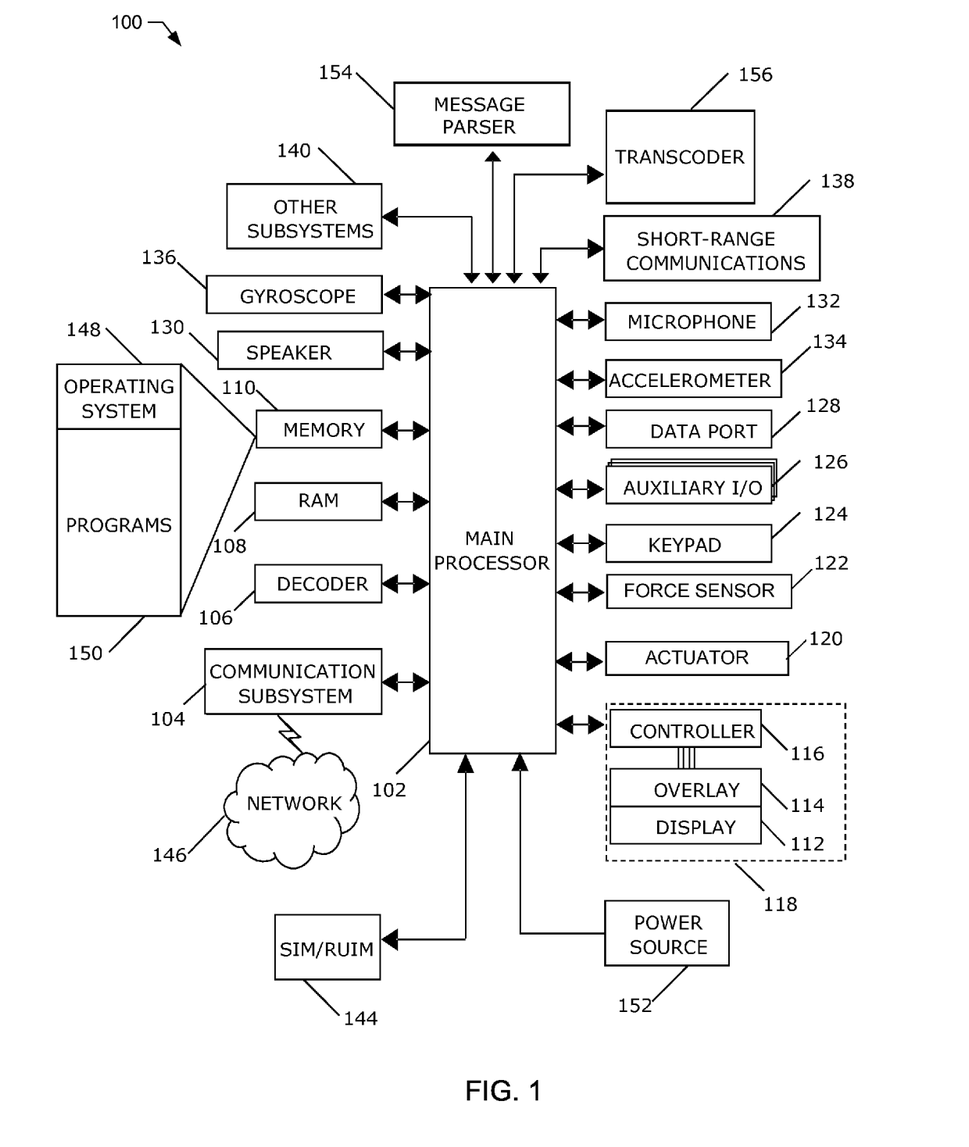
FIG. 1 is a block diagram of an example mobile device in accordance with the disclosure.

A block diagram of an example mobile device 100 is shown in FIG. 1. The mobile device 100 includes multiple components, such as a processor 102 that controls the overall operation of the mobile device 100. Communication functions, including data and voice communications, are performed through a communication subsystem 104. The example communication subsystem 104 includes any number and/or type(s) of network interface circuit(s). Data received by the mobile device 100 is decompressed and decrypted by a decoder 106. The communication subsystem 104 receives messages from and sends messages to a wireless network 146. The wireless network 146 may be any type of wireless network, including, but not limited to, data wireless networks, voice wireless networks, and networks that support both voice and data communications. A power source 152, such as one or more rechargeable batteries or a port to an external power supply, powers the mobile device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuator apparatus 120, one or more force sensors 122, a keypad 124, an auxiliary input/output (I/O) subsystem 126, a data port 128, a speaker 130, a microphone 132, an accelerometer 134, a gyroscope 136, short-range communications 138, and other device subsystems 140. User-interaction with a graphical user interface is performed through the touch-sensitive display 118. The processor 102 interacts with the touch-sensitive overlay 114 via the electronic controller 116. Information, such as text, characters, symbols, images, icons, and other items that may be displayed or rendered on a mobile device, is displayed on the touch-sensitive display 118 via the processor 102. In some examples, the display 112 may include a primary display and a secondary display. The display of information between the primary and the secondary displays are coordinated to provide information to a user when the electronic device is in an open position or a closed position.

To identify a subscriber for network access, the mobile device 100 uses a Subscriber Identity Module or a Removable User Identity Module (SIM/RUIM) card 144 for communication with a network, such as the wireless network 146. Alternatively, user identification information may be programmed into memory 110.

The mobile device 100 includes an operating system 148 and/or firmware and software programs or components 150 that are executed by the processor 102 to implement various applications and are typically stored in a persistent, updatable store such as the memory 110. Additional applications or programs may be loaded onto the mobile device 100 through the wireless network 146, the auxiliary I/O subsystem 126, the data port 128, the short-range communications subsystem 138, or any other suitable subsystem 140.

A received signal such as a text message, an e-mail message, or web page download is processed by the communication subsystem 104 and input to the processor 102. The processor 102 processes the received signal for output to the display 112 and/or to the auxiliary I/O subsystem 126. A subscriber may generate data items, for example e-mail messages, which may be transmitted over the wireless network 146 through the communication subsystem 104. For voice communications, the overall operation of the mobile device 100 is similar. The speaker 130 outputs audible information converted from electrical signals, and the microphone 132 converts audible information into electrical signals for processing. In some examples, the mobile device 100 has access (e.g., via the communication subsystem 104 and the wireless network 146) to a voicemail server. The mobile device 100 may initiate a voicemail access session with the voicemail server to retrieve voice messages for a user.

The example mobile device 100 of FIG. 1 further includes a message parser 154 and a transcoder 156 to, among other things, store copies of voice messages (e.g., voice messages retrieved from a voicemail server) on the mobile device 100 (e.g., on a storage device such as the RAM 108 and/or the memory 110) during a voicemail access session. While example storage devices are illustrated in FIG. 1, the voice messages and/or portion(s) of voice messages may be stored on any type of storage device including, without limitation, RAM, read-only memory (ROM), solid state memory (e.g., Flash), hard disk storage, and/or any other type of volatile or non-volatile memory. In the example of FIG. 1, the message parser 154 and the transcoder 156 identify message portions and/or non-message portions of voice messages, store copies of the voice messages on a storage device, and discard non-message portions of a voicemail access session. Storing local copies of voice messages on the mobile device 100 and/or discarding non-message portions enables a user of the mobile device 100 to save desired portions to the mobile device 100 for subsequent playback. The example message parser 154 and/or the transcoder 156 enable this local storage without causing all voice messages to be directed to the mobile device (as with visual voicemail) or implementing changes to legacy voicemail servers to support saving the messages to the mobile device 100.

As described below, the example message parser 154 detects message portion(s) and/or non-message portion(s) of a voicemail access session. In one example, the message parser 154 removes some or all non-message portions of a voicemail access session. For example, the message parser 154 detects non-message portion(s) of a voicemail access session (e.g., one or more speech messages of a voicemail access session) based on an action received by the user input device. As used herein, a speech message refers to an audible message including speech, such as a voicemail prompt, a voice message recorded at a server for delivery to the user that includes speech, and/or speech-based information such as the time, date, and/or phone number of the person recording the voice message. A speech message may include one or more message portion(s), may include no message portions (e.g., only non-message portions), and/or may include a combination of message and non-message portions.

In some examples, the message parser 154 detects message portions of a voicemail access session based on a comparison of a time length of a speech interval to a threshold. In some such examples, the time length of the speech interval does not include substantially silent periods (e.g., having a substantial lack of audio). As used herein, a silent period or silent portion of a speech interval or speech message refers to a period of a speech interval, or message, having a lack of audio. The memory 110 (or other storage device) stores the remaining portions (e.g., message portions) of the voicemail access session in an audio file. In some examples, the transcoder 156 transcodes the remaining portions of the voicemail access session to an audio file for storage on the memory prior to or after storage on the memory 110.

In some examples, the message parser 154 and/or the transcoder 156 are enabled during a voicemail access session by a user input (e.g., when a user accesses his or her voicemail). The user input may be received from a voice command (e.g., received via the microphone 132), a keystroke (e.g., received via the keypad 124), a touchscreen input (e.g., received via the touch-sensitive display 118), a physical/motion input (e.g., shaking, rotating, etc., received via the accelerometer 134 and/or the gyroscope 136) and/or any other input. In some examples, the user input to enable transcoding the voicemail access session is selected to avoid triggering an input recognizable by a voicemail server.

Figure 2:
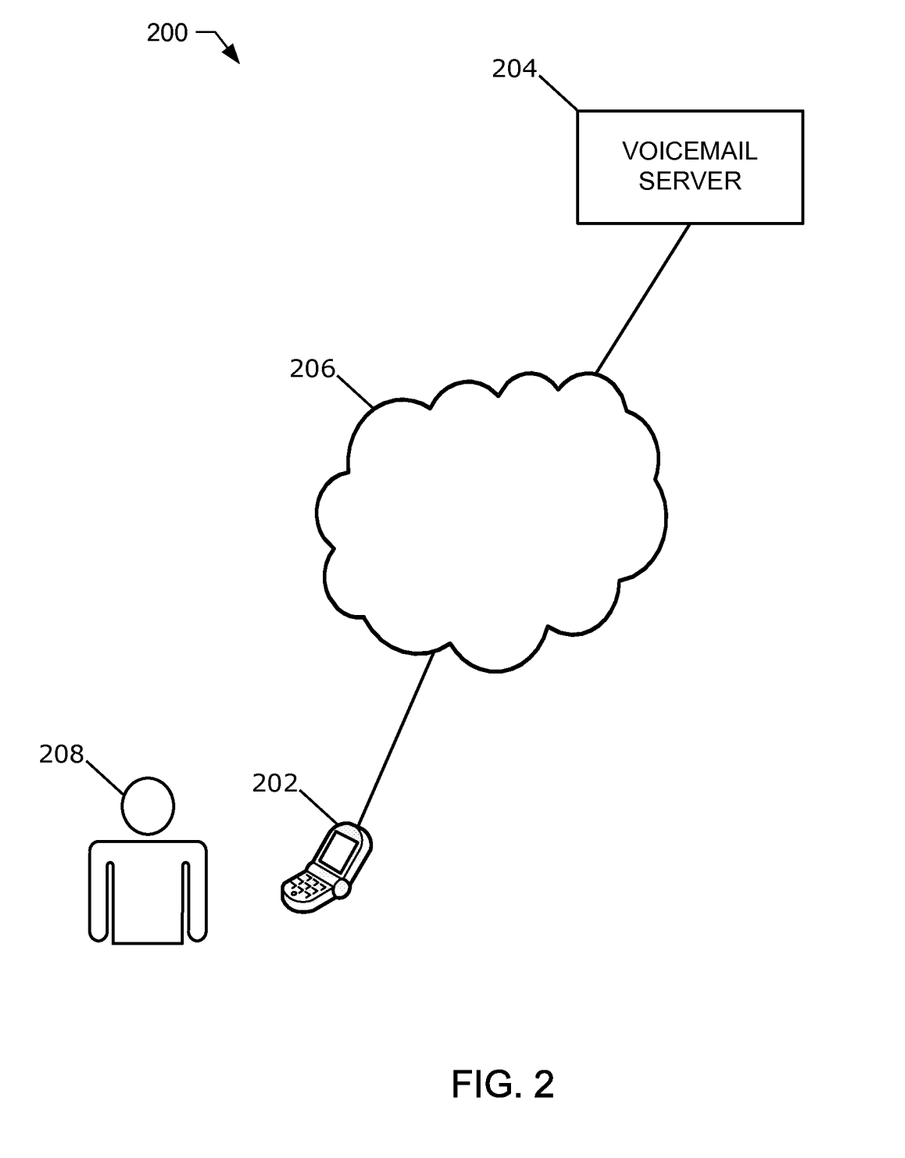
FIG. 2 illustrates an example system to retrieve voice messages on the mobile device.

FIG. 2 illustrates an example system 200 to retrieve voice messages using a mobile device 202. The example system 200 of FIG. 2 includes the mobile device 202, which accesses a voicemail server 204 via a network 206. For example, the mobile device 202 may be implemented using the mobile device 100 of FIG. 1 to access the example network 206 (e.g., the wireless network 146 of FIG. 1) via a communication subsystem (e.g., the communication subsystem 104) within the mobile device 100.

In some examples, a user 208 in possession of the mobile device 202 commands the mobile device 202 to access (e.g., call) the voicemail server 204. For example, the mobile device 202 may receive and/or display to the user 208 a notification that one or more unread voicemail messages are available for the user 208 on the voicemail server 204. In some examples, the mobile device 202 communicates with the voicemail server 204 via a voice call, similar to other wireless telephone calls, that uses airtime (e.g., network and/or wireless bandwidth). The communication session between the example mobile device 202 and the example voicemail server 204 of FIG. 2 is referred to herein as a voicemail access session, regardless whether the user actually retrieves/listens to any voice messages.

When the example mobile device 202 establishes a voicemail access session with the voicemail server 204, the example voicemail server 204 provides a voice-based interface so that the user 208 may retrieve voice messages and/or configure voicemail settings. As a part of the voice-based interface, the voicemail server 204 sends speech messages to the mobile device 202. The speech messages include message portions and non-message portions. Example message portions include the voice message (e.g., the voicemail, the audio stored on the voicemail server 204 for receipt by the user 208) and speech associated with the voice message (e.g., sender information, time stamp information, new or saved status, etc.). Example non-message portions include voice prompts instructing the user 208 regarding which buttons to select to interact with the voicemail server 204 in a desired manner.

The user 208 interacts with the example voice-based interface via key presses and/or voice responses. For example, the user 208 may press a corresponding key on the mobile device 202 and/or say "play" into the microphone of the mobile device 202 to cause the voicemail server 204 to play stored voice messages. To play the messages, the example voicemail server 204 encodes and transmits the voicemail messages as encoded audio messages to the mobile device 202. When the example mobile device 202 receives the encoded audio messages, the mobile device 202 decodes and plays the audio to the user 208 via a speaker. The example voice-based interface also provides messages via the encoded audio messages, which the mobile device 202 plays to the user 208.

During the voicemail access session, the example mobile device 202 monitors the encoded audio messages and/or the user inputs to determine whether to store speech messages (e.g., voice messages) on the mobile device 202 for later retrieval by the user 208. In some examples, storing the voice messages includes transcoding the audio information in the voice message into an audio file for storage in a file system of the mobile device 202. To store a speech message on the mobile device 202, the user 208 may press a designated save button. In some examples, the save button does not cause the mobile device 202 to interact with the voicemail server 204 (e.g., the voicemail server 204 does not interrupt playback of a voice message if the save button is pressed during playback). In some examples, the mobile device 202 buffers the voice message from the voicemail server 204 so that portions of the voice message that are played prior to the user 208 pressing the save button (e.g., if the user 208 presses the save key after at least a portion of the message has been played back) may be saved.

In some examples, the mobile device 202 determines whether a speech message has a non-message portion and, if so, removes the non-message portion from the speech message. In one example, the mobile device 202 determines whether a speech message has a non-message portion and, if so, removes the non-message portion from the speech message prior to storage of the speech message. Identification of the non-message portion(s) may occur prior to or after transcoding the speech message. In one example, identification of the non-message portion(s) occurs prior to storage of the speech message. The example mobile device 202 may use any of several methods to distinguish message portions from non-message portions of a speech message.

In some examples, the mobile device 202 of FIG. 2 determines whether a speech message has a non-message portion by monitoring inputs from the user 208 to determine a state of the voicemail access session with the voicemail server 204. For example, the voicemail server 204 of FIG. 2 may be configured in a manner similar to a state machine, where the state of the voicemail server 204 (e.g., the state of the voicemail access session) changes based on user inputs, the existence of unread voice messages, the existence of saved voice messages, etc. The configuration of the voicemail server 204 is programmed into the example mobile device 202 (e.g., prior to provisioning to the user 208, during installation of a voicemail application, etc.). Thus, the mobile device 202 is aware of the state of the voicemail access session. At least one of the states of the example voicemail access session is playing a voice message. When the mobile device 202 determines that the voicemail access session is playing a voice message based on the state, the example mobile device 202 determines that the speech message is a message portion to be saved on the mobile device 202.

In some examples, the mobile device 202 of FIG. 2 determines whether a speech message has a non-message portion based on a time length of the speech message. For example, the mobile device 202 may compare a time length of a speech message to a threshold. If the time length of the speech message is shorter than the threshold, the mobile device 202 determines that the speech message is a voicemail prompt or other non-message portion and discards, or at least does not store, the speech portion. In some such examples, the mobile device 202 does not include substantially silent portions of the speech message when determining whether the speech message is a non-message portion. For example, a speech message that is 13 seconds long, but includes 5 seconds of a substantial lack of audio, would be considered to be 8 seconds long for the purposes of determining whether it is a message portion.

In some examples, the mobile device 202 stores voicemail access session prompts as message portions. For example, prompts such as message sender identifications and/or timestamps of a voice message are generated by the voicemail server 204 but are stored with the actual voice message because they are related to, and provide important information about, the voice message.

Figure 3:
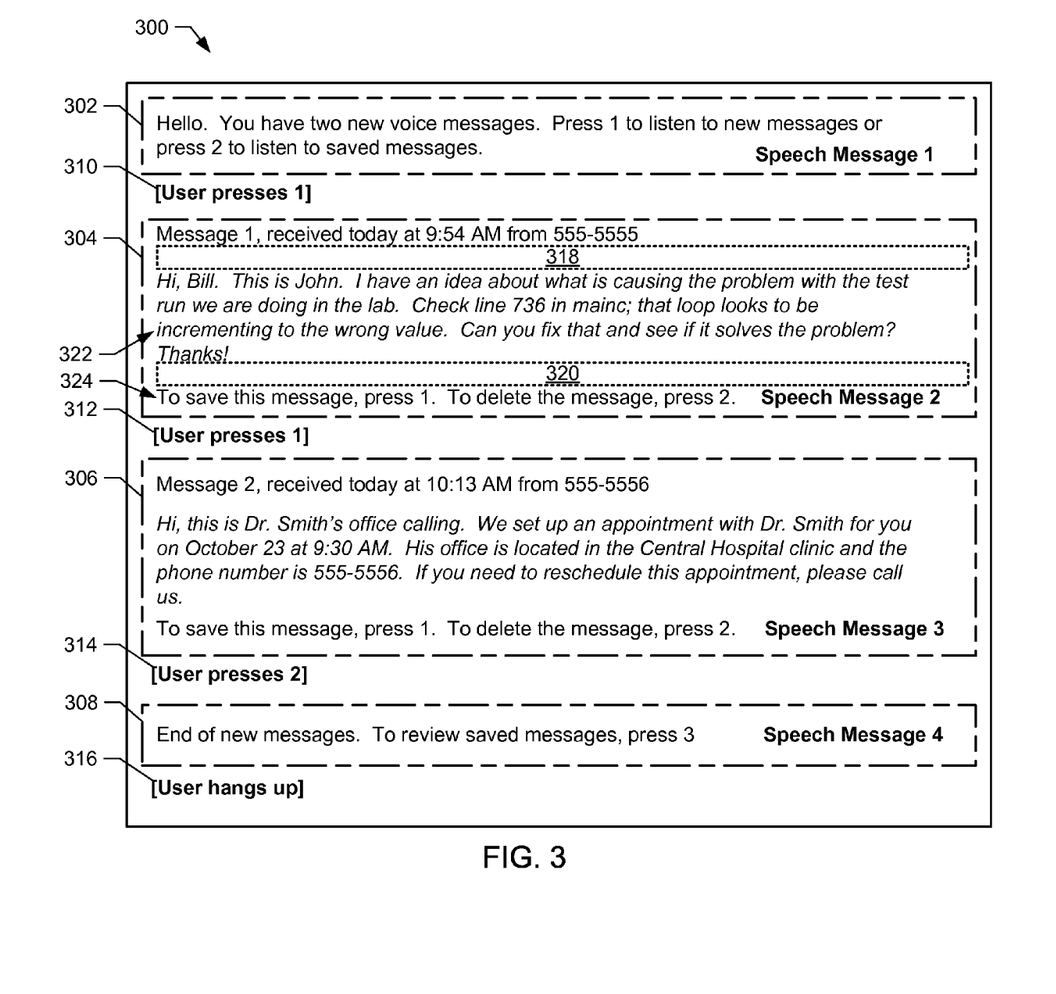
FIG. 3 illustrates an example voicemail access session and an identification of speech messages from the voicemail access session.

FIG. 3 illustrates a transcription of an example voicemail access session 300 including a number of portions and a determination of speech messages 302, 304, 306, 308 from the voicemail access session 300. The example voicemail access session 300 of FIG. 3 illustrates transcribed versions of the example speech messages that could be played audibly on a mobile device (e.g., the mobile devices 100, 202 of FIGS. 1 and 2) to a user (e.g., the user 208 of FIG. 2). The example voicemail access session 300 further shows user actions 310, 312, 314, 316 that represent a user interacting with a voicemail server (e.g., the voicemail server 204 of FIG. 2). Processing of the voicemail access session 300 of FIG. 3 will be described below with reference to the example processor 102, the example message parser 154, the example transcoder 156 and/or, more generally, the example mobile device 100 of FIG. 1 to illustrate the operation of the example mobile device 100. As a result of processing the voicemail access session 300, the example mobile device 100 stores message portions of the voicemail access session 300 and discards non-message portions of the voicemail access session 300.

The example speech message 302 is delivered to the user (e.g., the user 208 of FIG. 2) when the user 208 accesses the voicemail server 204 (and provides valid authentication information, if required). The example mobile device 100, 202 receives the speech message 302 (e.g., via the network 146, 206 of FIGS. 1 and 2). The example message parser 154 determines that the speech message 302 is a non-message portion. For example, the message parser 154 may determine that the state of the voicemail access session 300 is an initial prompt that occurs prior to messages being played to the user 208 (e.g., via the speaker 130 of FIG. 1). In some examples, the determination is based on providing to the message parser 154 a state machine associated with the voicemail server 204 and/or voicemail access sessions for the voicemail server 204. In some other examples, the message parser 154 may be provided with information about non-voice data (e.g., inaudible data) or cues transmitted by the voicemail server 204 (e.g., information to demarcate or otherwise identify prompts, voice messages, voice message data, etc.), and determine a state of the voicemail server 204 upon receiving such inaudible data or cues. Additionally or alternatively, the message parser 154 determines that the time length of the speech message 302 is less than a threshold length and, thus, does not include a message portion.

In response to the speech message 302, the user 208 presses '1' 310 on the user device 100 (e.g., on the keypad 124). The user input is sent to the voicemail server 204, which sends a second speech message 304 including a voice message to the mobile device 100, 202. The example mobile device 100, 202 receives the speech message 304 and plays the speech message 304 to the user 208 via the speaker 130. During and/or after playback of the speech message 304, the message parser 154 determines that the speech message 304 includes a message portion and is to be stored on the mobile device 100, 202 (e.g., in the memory 110). For example, the message parser 154 may determine during playback that the speech message 304 has a time length greater than a threshold length. In some such examples, the message parser 154 determines the time length of the speech message 304 not including silent portions 318, 320. Additionally or alternatively, after playback of the speech message 304, the example message parser 154 determines a state of the voicemail access session 300 during the speech message 304 based on the first user input 310 and a second user input 312 (e.g., the user presses 1 to save the voice message on the voicemail server 204). Based on one or both of the two example user inputs 310, 312, the message parser 154 may determine that the speech message 304 included a message portion (and did not include non-message portion(s) to be removed).

In some examples, the message parser 154 determines that the example speech message 304 includes a message portion and a non-message portion. For example, the message parser 154 may determine that there is a message portion 322 based on the state of the voicemail access session 300 (e.g., using the user inputs). Further, the example message parser 154 determines that there is a non-message portion 324 based on the state of the voicemail access session 300 and separated from the message portion by the silent period 320. The message parser 154 determines the state of the voicemail access session 300 based on a configuration of the voicemail server 204 provided to the mobile device 100, 202. In some examples, the configuration includes information regarding the prompts following playback of voice messages. Thus, the example message parser 154 detects the message portion 322 (e.g., including the voice message and metadata for the voice message provided prior to playback), the silent portion 320 following the message portion 322, and the non-message portion 324 based on the configuration of the voicemail server 204. The memory 110 stores (e.g., immediately following the determination or at a later time) at least the message portion 322 in a memory or storage of the mobile device 100, 202 and discards (e.g., does not store) the non-message portion 324.

The example voicemail server 204 continues by sending a next stored, unread voice message, included in a speech message 306, to the mobile device 100. The example mobile device 100 receives the speech message 306 and plays the speech message 306 to the user 208 via the speaker 130. During and/or after playback of the speech message 306, the message parser 154 determines that the speech message 306 includes a message portion and is to be stored on the mobile device 100, 202 (e.g., in the memory 110). The analysis of the speech message 306 may be similar to the analysis of the speech message 304 (e.g., determining a state of the voicemail access session, comparing a time length of the speech message 306 to a threshold, etc.). In the example of FIG. 3, the message parser 154 determines that the speech message 306 includes a message portion and does not include a non-message portion to be removed. After the speech message 306 is played to the user 208, the user 208 presses '2' 314. In response, the voicemail server 204 deletes the voice message contained in the speech message 306.

The voicemail server 204 then sends a speech message 308 including a voice prompt to the mobile device 100, 202. The example message parser 154 determines that the speech message 308 does not include a message portion to be saved, and includes only a non-message portion to be removed. For example, the message parser 154 may determine that the speech message 308 does not include a message portion based on the time length of the speech message 308 and/or the determined state of the voicemail access session 300. The example user 208 then hangs up 316, ending the example voicemail access session 300.

During or after the voicemail access session 300, the example transcoder 156 of FIG. 1 transcodes the speech messages 304, 306 having message portions (e.g., for storage on the mobile device 100, 202). In the example of FIG. 3, the speech messages 304, 306 are automatically transcoded upon completion of receipt of the message and stored in the memory 110. In some other examples, the transcoder 156 transcodes the speech message 304, 306 after receiving a designated input from the user 208, and the transcoded speech message is stored on the mobile device 100, 202 (e.g., in the memory 110).

While example manners of implementing the mobile device 100 have been illustrated in FIG. 1, one or more of the elements, processes and/or devices illustrated in FIG. 1 may be combined, divided, re-arranged, omitted, eliminated and/or implemented in any other way. Further, the example processor 102, the example communication subsystem 104, the example memory 110, the example message parser 154, the example transcoder 156 and/or, more generally, the example mobile device 100 of FIG. 1 may be implemented by hardware, software, firmware and/or any combination of hardware, software and/or firmware. Thus, for example, any of the example processor 102, the example communication subsystem 104, the example memory 110, the example message parser 154, the example transcoder 156 and/or, more generally, the example mobile device 100 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example processor 102, the example communication subsystem 104, the example memory 110, the example message parser 154, the example transcoder 156 are hereby expressly defined to include a tangible computer readable medium such as a memory, DVD, CD, etc. storing the software and/or firmware. Further still, the example mobile device 100 of FIG. 1 may include one or more elements, processes and/or devices in addition to, or instead of, those illustrated in FIG. 1, and/or may include more than one of any or all of the illustrated elements, processes and devices.

Figure 4:
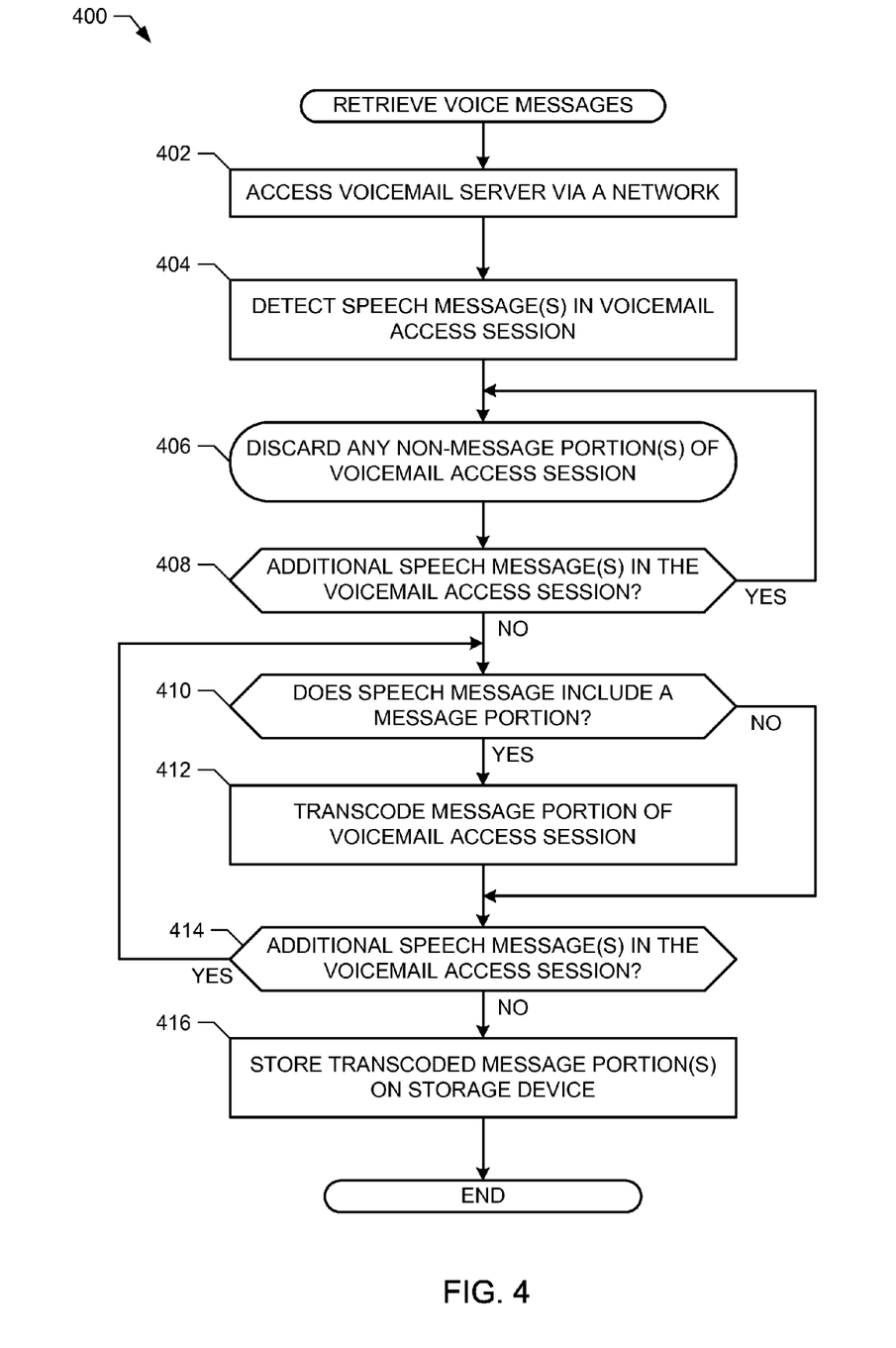
FIG. 4 is a flowchart representative of an example method to retrieve voice messages.
Figure 5:
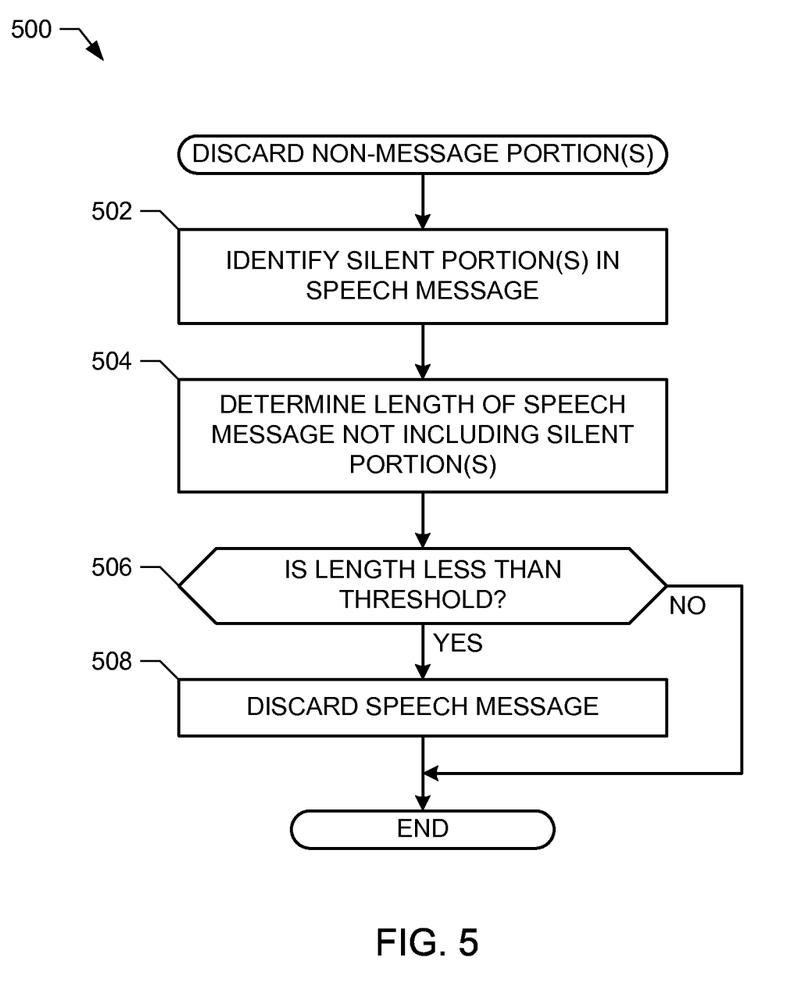
FIG. 5 is a flowchart representative of an example method to discard non-message portion(s) of the voicemail access session.
Figure 6:
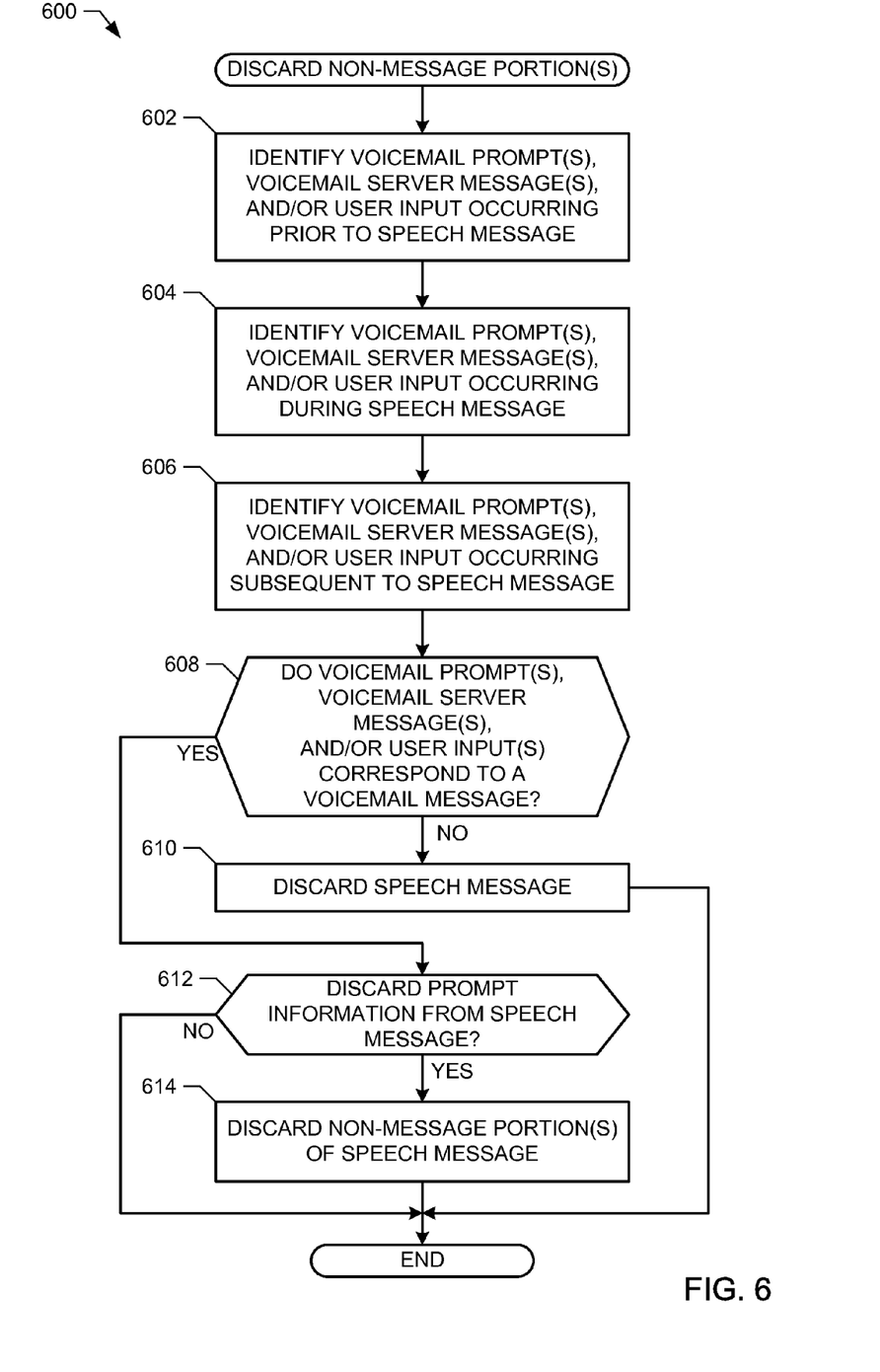
FIG. 6 is a flowchart representative of another example method to discard non-message portion(s) of the voicemail access session.

Flowcharts representative of example machine readable instructions for implementing the mobile device 100 of FIG. 1 are shown in FIGS. 4-6. In these examples, the machine readable instructions comprise program(s) for execution by a processor such as the processor 102 shown in the example mobile device 100 discussed above in connection with FIG. 1. The program may be embodied in software stored on a tangible computer readable medium such as the RAM 108 and/or the memory 110 associated with the processor 102, but the entire program and/or parts thereof could alternatively be executed by a device other than the processor 102 and/or embodied in firmware or dedicated hardware. Further, although the example program(s) are described with reference to the flowcharts illustrated in FIGS. 4-6, many other methods of implementing mobile device 100 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer readable instructions) stored on a tangible computer readable medium such as a hard disk drive, a flash memory, a read-only memory (ROM), a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 4 is a flowchart representative of an example method 400 to retrieve voice messages. The example method 400 of FIG. 4 may be used to implement the mobile device 100 of FIG. 1. The method 400 begins when a user (e.g., the user 208 of FIG. 2) accesses a voicemail server (e.g., the voicemail server 204 of FIG. 2) via a mobile device (e.g., the mobile devices 100, 202 of FIGS. 1, 2) to retrieve voicemail messages.

The example mobile device 100 accesses the voicemail server 204 via a network (e.g., the network 206 of FIG. 2) (block 402). In response, the voicemail server 204 initiates a voicemail access session and begins sending speech messages, such as voicemail prompts and voice messages, to the mobile device 100. The example mobile device 100 detects (e.g., via the message parser 154 of FIG. 1) speech message(s) in the voicemail access session (block 404). The mobile device 100 discards any non-message portion(s) of the voicemail access session (block 406). For example, the mobile device 100 may discard whole speech messages and/or non-message portions of speech messages. Example methods to discard non-message portion(s) of a voicemail access session are described below with reference to FIGS. 5 and 6. In the example method 400 of FIG. 4, the message parser 154 processes each of the speech messages in the voicemail access session to remove non-message portions. If there are additional speech messages in the voicemail access session (block 408), the example method 400 returns to block 406 to discard non-message portion(s) of the voicemail access session.

If there are no additional speech messages in the voicemail access session (block 408), the example mobile device 100 (e.g., via the transcoder 156 of FIG. 1) determines whether a speech message includes a message portion (block 410). If the example speech message includes a message portion (block 410), the transcoder 156 transcodes the message portion of the voicemail access session (block 412). For example, the transcoder 156 may transcode an entire speech message and/or a message portion of a speech message. In the example of FIG. 4, the transcoder 156 transcodes the message portion of the voicemail access session into a compressed audio file, such as an MPEG-1 or MPEG-2 Audio Layer III (MP3) file. Any past, present, and/or future audio file format, public or proprietary, may additionally or alternatively be used to transcode the speech message.

After transcoding the message portion of the voicemail access session (block 412), or if the speech message does not include a message portion (block 410), the example mobile device 100 determines if there are additional speech message(s) in the voicemail access session (block 414). If there are additional speech message(s) (block 414), control returns to block 410 to determine whether a speech message includes a message portion.

When there are no additional speech message(s) in the voicemail access session (block 414), the example storage device (e.g., the memory 110) stores the transcoded message portion(s) (block 416). The example method 400 of FIG. 4 may then end.

In some examples, the method 400 of FIG. 4 may be used to retrieve voice messages from a voicemail server and to locally store the voice messages on a mobile device. In some such examples, the method 400 stores a message portion of the voice message and discards (e.g., does not store) one or more non-message portion(s) of the voice message. The example method 400 may thereby save airtime when a user wishes to listen to a voice message multiple times, store voice messages while discarding voicemail server prompts, and/or enable use of trick-play functions (e.g., fast-forward, skip to time, pause, etc.) when listening to a voice message at a later time.

While the example method 400 of FIG. 4 processes the speech message(s) in the voicemail access session for non-message portion(s) and then for message portion(s), followed by transcoding the message portion(s), different sequences may additionally or alternatively be used. For example, transcoding of speech messages may occur prior to discarding non-message portions. As another example, message portions of speech messages may be determined prior to discarding of non-message portions. Other sequences and/or combinations may also be used.

FIG. 5 is a flowchart representative of an example method 500 to discard non-message portions of a speech message. The example method 500 of FIG. 5 may be used to implement block 406 of FIG. 4 to discard non-message portion(s) of a voicemail access session. The example method 500 begins by considering a speech message detected in a voicemail access session. The example mobile device 100 of FIG. 1 (e.g., via the message parser 154) identifies silent portion(s) in the speech message (block 502). The example message parser 154 determines a time length of the speech message, not including the identified silent portion(s) (if any) (block 504). The message parser 154 determines if the time length is less than a threshold length (block 506). In some examples, the threshold is representative of a time length that is likely to represent a voice message and not likely to represent a voice prompt from the voicemail server 204. If the time length is less than the threshold (block 506), the example message parser 154 discards the speech message (block 508). After discarding the speech message (block 508), or if the length is not less than the threshold (block 506), the example method 500 may end and control returns to block 408 of FIG. 4).

FIG. 6 is a flowchart representative of an example method 600 to discard non-message portions of a speech message. The example method 600 of FIG. 6 may be used to implement block 406 of FIG. 4 to discard non-message portion(s) of a voicemail access session. The example method 600 begins by considering a speech message detected in a voicemail access session. The example methods 500, 600 of FIGS. 5 and 6 may be used separately and/or in combination to discard non-message portions of a voicemail access session.

The example mobile device 100 of FIG. 1 (e.g., via the message parser 154) identifies voicemail prompt(s), voicemail server message(s), and/or user input occurring prior to the speech message (block 602). For example, the message parser 154 may determine that a user presses a key prior to the speech message (e.g., the user input 310 prior to the speech message 304 of FIG. 3), the voicemail server has sent inaudible data identifying a state of the voicemail access session as requesting a user input (e.g., a voice prompt), and/or a voice prompt is received prior to the speech message (e.g., the speech message 302 is received prior to the speech message 304 of FIG. 3).

The example message parser 154 further identifies voicemail prompt(s), voicemail server message(s), and/or user input occurring during the speech message (block 604). For example, the message parser 154 may determine that a user presses a key during the speech message, the voicemail server 204 provides data indicating that a voice message is playing, and/or a voice prompt is received during the speech message (e.g., the non-message portion 324 is received during the speech message 304 of FIG. 3).

The example message parser 154 identifies voicemail prompt(s), voicemail server message(s), and/or user input occurring subsequent to the speech message (block 606). For example, the message parser 154 may determine that a user presses a key subsequent to the speech message (e.g., the user input 312 after the speech message 304 of FIG. 3), the voicemail server has sent inaudible data identifying a state of the voicemail access session as requesting a user input (e.g., a voice prompt), and/or a voice prompt is received subsequent to the speech message (e.g., the speech message 308 is received after the speech message 306 of FIG. 3).

The example message parser 154 determines whether the voicemail prompt(s) and/or the user input(s) (e.g., prior to, during, and/or subsequent to the speech message) correspond to a voicemail message (block 608). For example, the message parser 154 may determine whether a combination of voicemail prompt(s) and/or user input(s) corresponds to a state and/or change in state based on the configuration of the voicemail server 204. If the voicemail prompt(s) and/or the user input(s) do not correspond to a voicemail message (block 608), the example message parser 154 discards the speech message (block 610).

On the other hand, if the voicemail prompt(s) and/or the user input(s) correspond to a voicemail message (block 608), the example message parser 154 determines whether to discard prompt information from the speech message (block 612). If the message parser 154 is to discard prompt information (block 612), the example message parser 154 discards non-message portion(s) of the speech message (block 614). For example, the message parser 154 may discard the non-message portion 324 (e.g., a voicemail prompt following a voice message) of the example speech message 304 of FIG. 3.

After discarding the non-message portion(s) of the speech message (block 614), or if the message parser 154 is not to discard the prompt information (block 612), or after discarding the speech message (block 610), the example method 600 of FIG. 6 may end, and control returns to block 408 of FIG. 4.

From the foregoing, it will be appreciated that example methods and devices disclosed herein may be used to store voicemail messages locally on a mobile device. Example methods and devices disclosed herein reduce an amount of connectivity time (e.g., airtime minutes) spent by the user to access messages multiple times. Further, example methods and devices disclosed herein enable local storage of voicemail messages substantially without requiring changes to voicemail servers to enable the interaction with the methods and devices. Example methods and devices disclosed herein store voice messages on a mobile device while automatically discarding voicemail prompt information, thereby reducing the amount of storage used to store the voice messages locally and reducing the amount of time the user must listen to hear the stored voice messages.

Finally, although certain example methods and devices have been described herein, the scope of coverage of this disclosure is not limited thereto. On the contrary, this disclosure covers all methods and devices fairly falling within the scope of the appended claims either literally or under the doctrine of equivalents.

What is claimed is:

1. A mobile device, comprising:
   a processor and memory;
   a display;
   a network interface to a network configured for communicative coupling to a remote voicemail server;
   a message parser comprising machine readable instructions executing in the memory of the mobile device to receive into the mobile device speech audio from a voicemail access session established through the network interface with the remote voicemail server, to identify within the speech audio a voice message portion and a non message portion that is not included as part of the voice message based upon non-voice data associated with the voicemail access session and received from the voicemail server, and to store into the memory of the mobile device the identified voice message portion while excluding from the storing into the memory the non-message portion.

2. A device as defined in claim 1, further comprising a user input device, the message parser detecting the non-message portion in response to input received at the user input device.

3. A device as defined in claim 1, wherein the message parser identifies the voice message based upon a comparison of a time length of a speech interval of the speech audio to a pre-stored threshold value.

4. A device as defined in claim 1, wherein the non-message portion of the voicemail access session comprises a voicemail prompt transmitted by the voicemail server, the message parser to detect the voicemail prompt based on a comparison of a time length of a speech interval to a threshold.

5. A device as defined in claim 3, wherein the time length of the speech interval is based on a presence of audio during the playback of speech audio.

6. A device as defined in claim 1, wherein the non-voice data comprises a substantial lack of audio detected during playback of the speech audio.

7. A device as defined in claim 1, further comprising a transcoder executing in the memory of the mobile device and comprising machine readable instructions enabled to transcode the message portion of the voicemail access session into text and to store the text of the transcoded message portion into the memory of the mobile device.

8. A device as defined in claim 1, wherein the message parser determines a state of the voicemail access session based upon at least one of a configuration of the voicemail server, non-voice data received from the voicemail server, a voice prompt received from the voicemail server, and a user input; and wherein the message parser detects the non-message portion based upon a determined state of the voicemail access session.

9. A mobile device, comprising:
a processor; and
a first storage device comprising machine readable instructions which, when executed by the processor, cause the processor to at least:
access a voice message in a voicemail server via a network;
receive into the mobile device speech audio for the voice message from the voice mail server;
identify within the speech audio a voice message portion and a non message portion that is not included as part of the voice message based upon non-voice data associated with accessing the voice message and received from the voicemail server;
discard the non-message portion; and
store the voice message portion on the first storage device while excluding from the storing the non-message portion.

10. A device as defined in claim 9, wherein the machine readable instructions, when executed, cause the processor to discard a substantially silent portion of the speech audio.

11. A device as defined in claim 9, wherein the machine readable instructions, when executed, cause the processor to transcode the voice message portion and store the transcoded voice message portion on the first storage device.

12. A device as defined in claim 9, wherein the machine readable instructions, when executed, cause the processor to determine a time length of the voice message portion, to compare the time length to a threshold, and to store the voice message portion when the time length is greater than the threshold.

13. A device as defined in claim 9, wherein the machine readable instructions, when executed, cause the processor to identify the voice message portion based upon at least one of a voicemail prompt or a user input.

14. A method, comprising:
accessing a voicemail server remotely from a mobile device via a network;
receiving from the voicemail server into the mobile device speech audio including both a message portion representative of a voicemail message, and a non-message portion providing metadata regarding the voicemail message;
identifying within the mobile device speech audio a voice message portion and a non message portion that is not included as part of the mobile device voice message based upon non-voice data associated with accessing the voicemail server;
automatically discarding a non-message portion of the speech audio; and
storing only the message portion representative of the voicemail message in storage within the mobile device.

15. A method as defined in claim 14, further comprising detecting a user input during the voicemail access session and identifying the non-message portion of the voicemail access session based responsive to the user input.

16. A method as defined in claim 14, further comprising transcoding the message portion of the voicemail access session into text and storing the text in the storage of the mobile device.

* * * * *